US011953111B1

(12) United States Patent
Owens et al.

(10) Patent No.: US 11,953,111 B1
(45) Date of Patent: Apr. 9, 2024

(54) SPLIT BODY, ROTARY C GATE, REMOVEABLE STEM, VACUUM VALVE

(71) Applicants: Clay Owens, Springdale, AR (US); Alan Davison, Springdale, AR (US); Chris Clouse, Fayetteville, AR (US); Jerry George McGarrah, Prairie Grove, AR (US)

(72) Inventors: Clay Owens, Springdale, AR (US); Alan Davison, Springdale, AR (US); Chris Clouse, Fayetteville, AR (US); Jerry George McGarrah, Prairie Grove, AR (US)

( * ) Notice: Subject to any disclaimer, the term of this patent is extended or adjusted under 35 U.S.C. 154(b) by 233 days.

(21) Appl. No.: 17/676,993

(22) Filed: Feb. 22, 2022

Related U.S. Application Data

(63) Continuation-in-part of application No. 16/862,743, filed on Apr. 30, 2020, now Pat. No. 11,287,047.

(51) Int. Cl.
| F16K 5/06 | (2006.01) |
| F16K 5/20 | (2006.01) |
| F16K 27/06 | (2006.01) |
| F16K 51/02 | (2006.01) |

(52) U.S. Cl.
CPC .......... *F16K 27/067* (2013.01); *F16K 5/0642* (2013.01); *F16K 5/201* (2013.01); *F16K 51/02* (2013.01)

(58) Field of Classification Search
CPC ..... F16L 3/1008; F16L 3/1016; F16L 3/1091; F16L 3/18; Y10T 137/0508; Y10T 137/0525; F16K 27/067; F16K 31/522; F16K 31/521; F16K 31/5282; F16K 31/5284; F16K 5/0605; F16K 5/0626; F16K 5/0642; F16K 5/0647; F16K 1/2014; F16K 1/2028; F16K 1/22; F16K 1/224
See application file for complete search history.

(56) References Cited

U.S. PATENT DOCUMENTS

| 3,191,906 | A | 6/1965 | Zeigler et al. | 251/208 |
| 3,501,128 | A | 3/1970 | Pool | 251/175 |
| 3,528,448 | A | 9/1970 | Urban | 137/242 |
| 4,397,445 | A | 8/1983 | Burquier | 251/149.9 |
| 4,744,572 | A | 5/1988 | Sahba et al. | 277/236 |
| 4,968,000 | A | 11/1990 | Hubertson et al. | 251/171 |
| 6,981,691 | B2 | 1/2006 | Caprera | 251/298 |
| 10,487,956 | B2 | 11/2019 | Meyer et al. | |

(Continued)

FOREIGN PATENT DOCUMENTS

| DE | 9209155 U1 | 9/1992 |
| EP | 0227873 A1 | 7/1987 |

*Primary Examiner* — Hailey K. Do
(74) *Attorney, Agent, or Firm* — Keisling & Pieper PLC.; David B. Pieper; Trent C. Keisling

(57) ABSTRACT

A split body, rotary C gate, removeable stem vacuum valve using an input assembly with handle extensions that allow for hand movement of the incoming pipe to access an inner aperture body with a curved sealing face that directly seals to a C shaped gasketless gate that can be rotated into and out of the inner body aperture for easy cleaning. The gasketless gate is held in position using gate axles with an outer axle stem connected to a polygon lower body that mates into a matching polygon aperture on the gasketless gate. The middle valve assembly's gasketless housing body defines upper and lower axle washer pockets for locating the axles for proper operation and simple axle pins for securing the axles in position.

10 Claims, 29 Drawing Sheets

(56) References Cited

U.S. PATENT DOCUMENTS

| | | |
|---|---|---|
| 11,287,047 B1 | 3/2022 | Owens et al. |
| 2010/0176326 A1 | 7/2010 | Moison et al. ............... 251/235 |
| 2011/0049408 A1 | 3/2011 | Gutmann et al. ........ 251/315.08 |
| 2016/0177548 A1 | 6/2016 | Marshall |

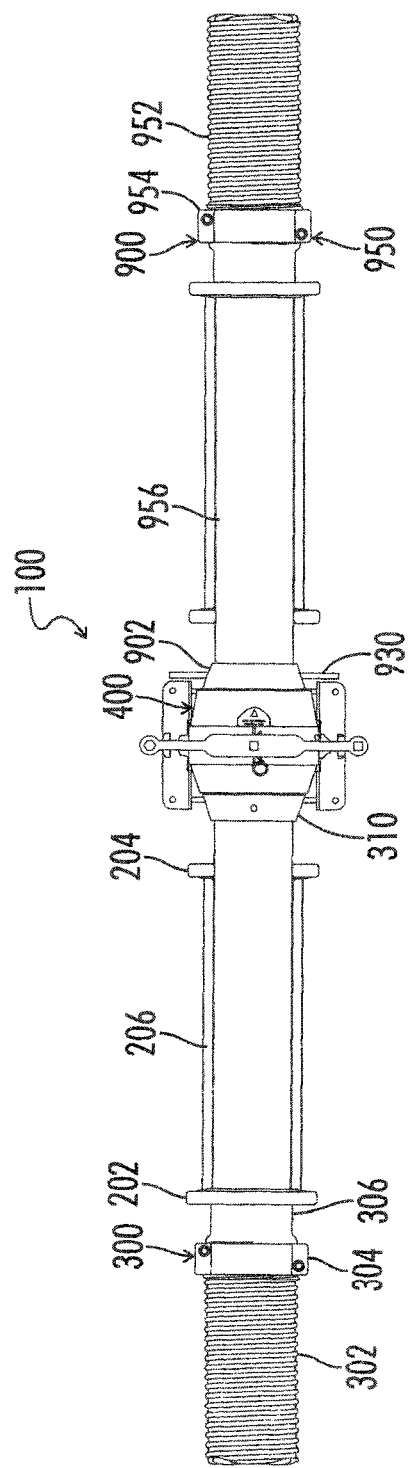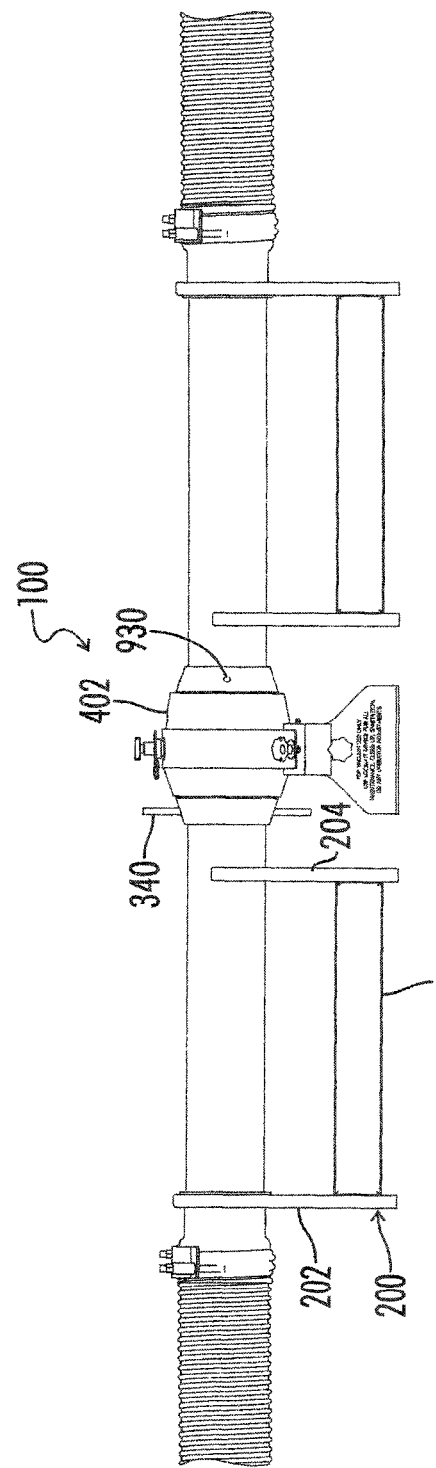

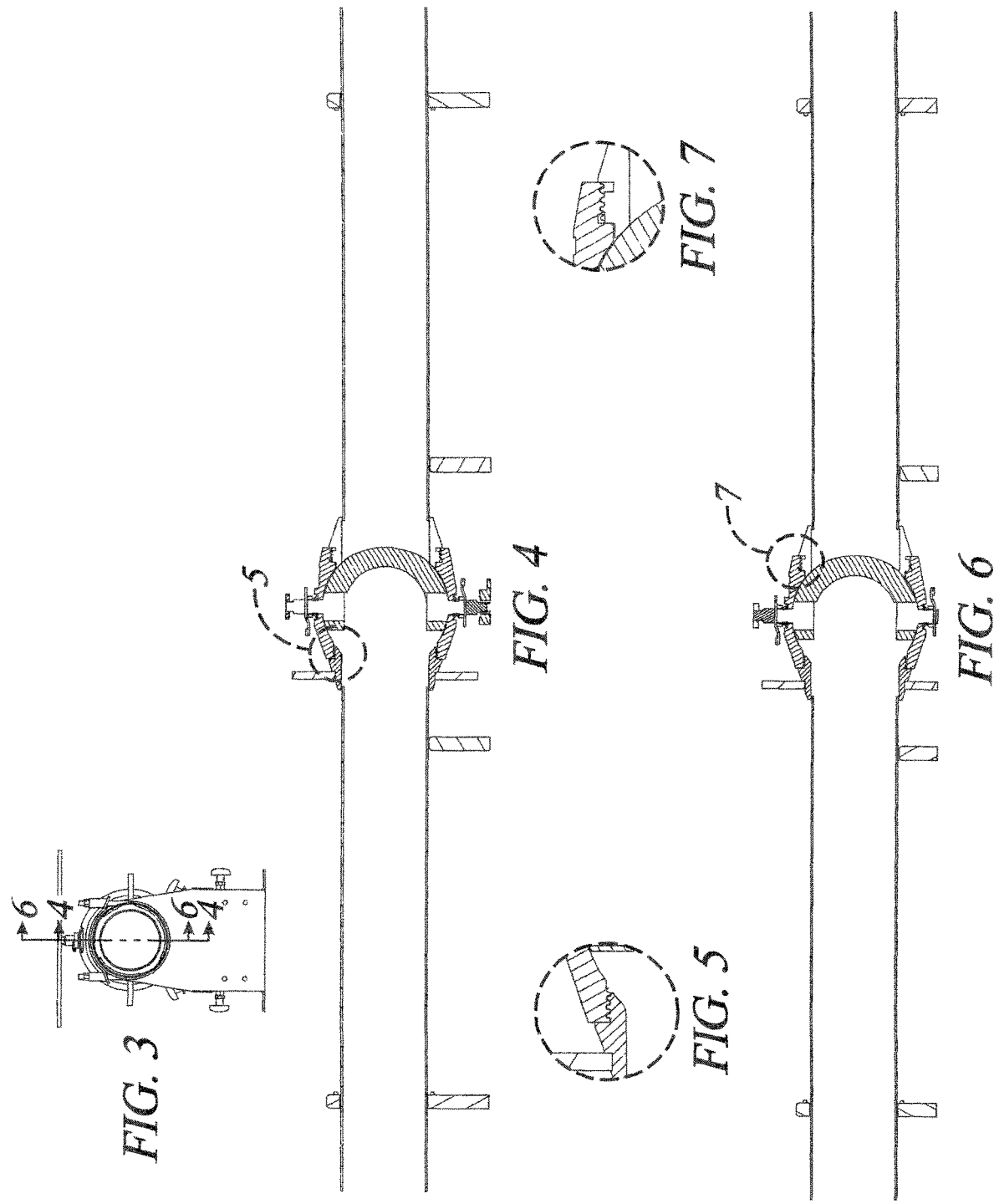

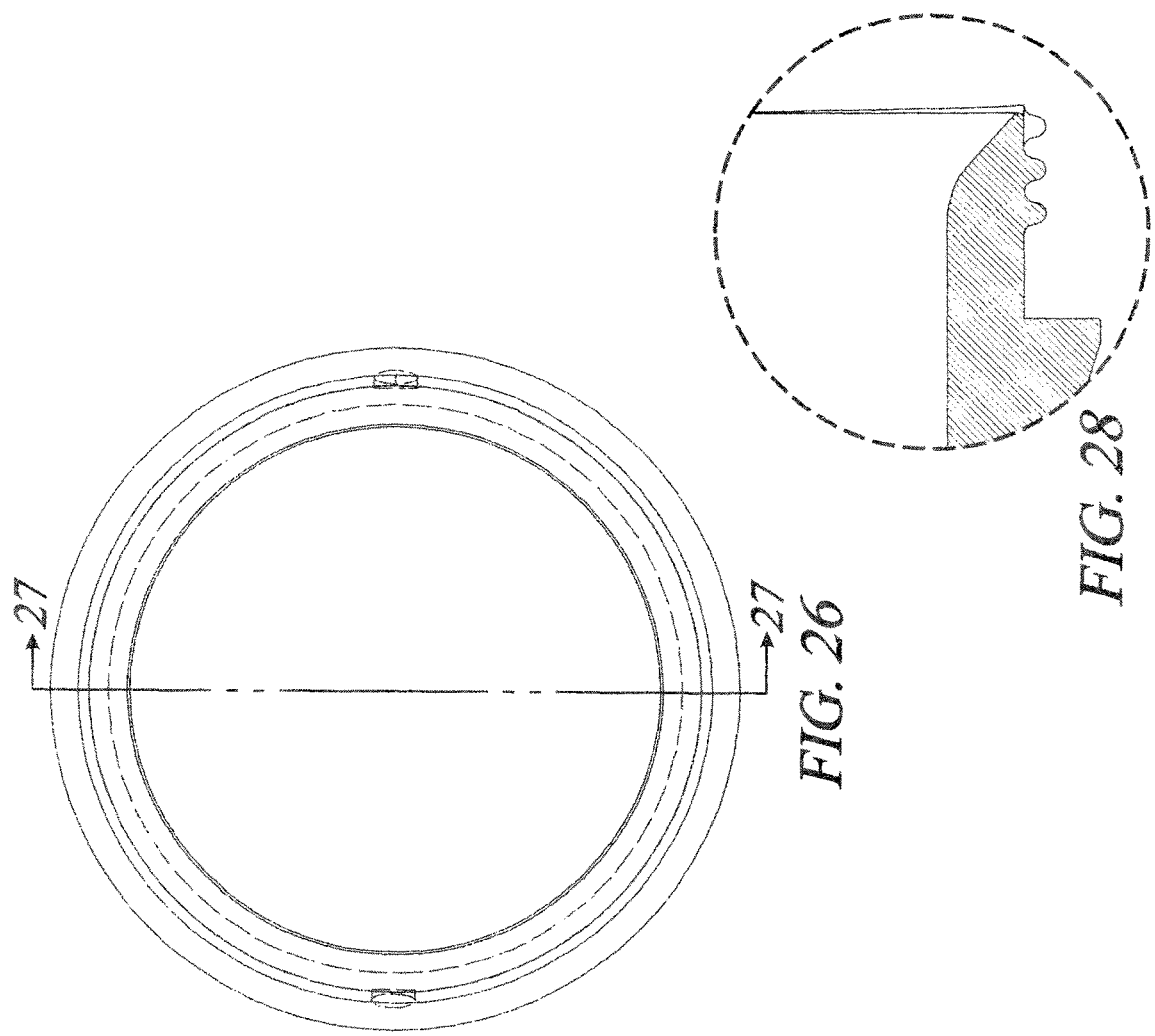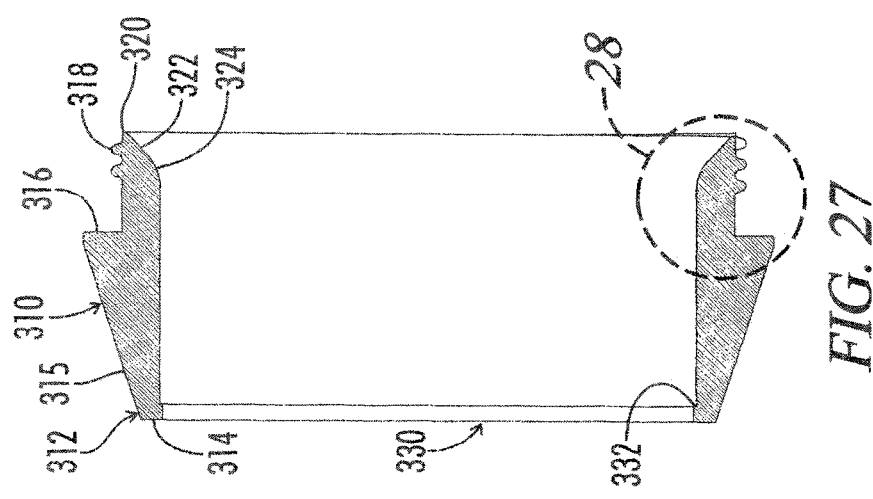

SPLIT BODY, ROTARY C GATE, REMOVEABLE STEM, VACUUM VALVE

CROSS-REFERENCE TO RELATED APPLICATIONS

This application claims priority to and is a continuation-in-part of U.S. patent application Ser. No. 16/862,743, filed on Apr. 30, 2020 entitled SPLIT BODY, ROTARY C GATE, REMOVEABLE STEM, VACUUM VALVE which is hereby incorporated by reference in its entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in valves. More particularly, the invention relates to improvements particularly suited for quickly disassembling and cleaning food processing valves. In particular, the present invention relates specifically to a C gate valve with handles and easy assembly.

2. Description of the Known Art

As will be appreciated by those skilled in the art, segmented ball valves are known in various forms. Patents disclosing information relevant to valves include: U.S. Pat. No. 4,744,572, issued to Sahba, et al. on May 17, 1988 entitled All-metal, valve sealing mechanism; U.S. Pat. No. 4,968,000, issued to Hubertson, et al. on Nov. 6, 1990 entitled Valve; and U.S. Pat. No. 6,981,691, issued to Caprera on Jan. 3, 2006 entitled Dual segment ball valve. Each of these patents is hereby expressly incorporated by reference in their entirety.

From these prior references it may be seen that these prior art patents are very limited in their teaching and utilization, and an improved valve is needed to overcome these limitations.

SUMMARY OF THE INVENTION

The present invention is directed to an improved split body, rotary C gate, removeable stem vacuum valve. The assembly uses a rotating-sliding-hose support supporting an input assembly with handle extensions that allow for hand movement of the incoming pipe to unthread it from a middle valve assembly and a similar output assembly with handle extensions that also allows easy movement of the output pipe. The middle valve assembly includes input and output threads and depth stops for threadably connecting endcaps for the input and output pipes and includes an inner aperture body with a curved sealing face that directly seals without any additional gasket to a C shaped gasketless gate that can be rotated into and out of the inner body aperture for easy cleaning. The gasketless gate is held in position using gate axles with an outer axle stem connected to a polygon lower body that mates into a matching polygon aperture on the gasketless gate. The middle valve assembly's gasketless housing body defines upper and lower axle washer pockets for locating the axles for proper operation and simple axle pins for securing the axles in position. In this manner, the endcaps, c shaped gate, and axles can all be disassembled by hand for regular cleaning while still providing a vacuum seal valve. These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views:

FIG. 1 is a side view of a toolless hand manipulated valve assembly.

FIG. 2 is a top view of the toolless hand manipulated valve assembly.

FIG. 3 is an output end view of the toolless hand manipulated valve assembly.

FIG. 4 is a cutaway side view of the toolless hand manipulated valve assembly showing the lower actuator connection along line A-A of FIG. 3.

FIG. 5 is an enlarged view of the input endcap to valve body connection.

FIG. 6 is a cutaway side view of the toolless hand manipulated valve assembly showing the upper handle connection along line B-B of FIG. 3.

FIG. 7 is an enlarged view of the output endcap to valve body connection.

FIG. 26 shows an end view of the input endcap.

FIG. 27 shows a cutaway along line A-A FIG. 26.

FIG. 28 shows an enlarged view of area B in FIG. 28.

DETAILED DESCRIPTION OF THE INVENTION

Figure 8:
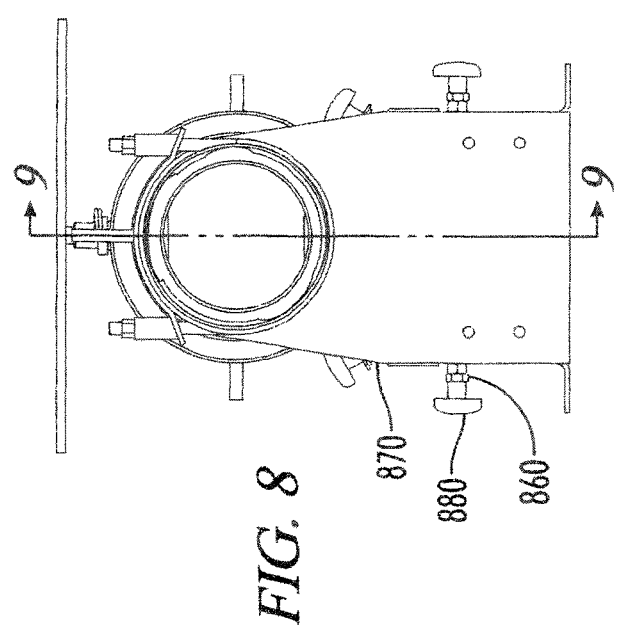
FIG. 8 is an input end view of the toolless hand manipulated valve assembly.
Figure 9:
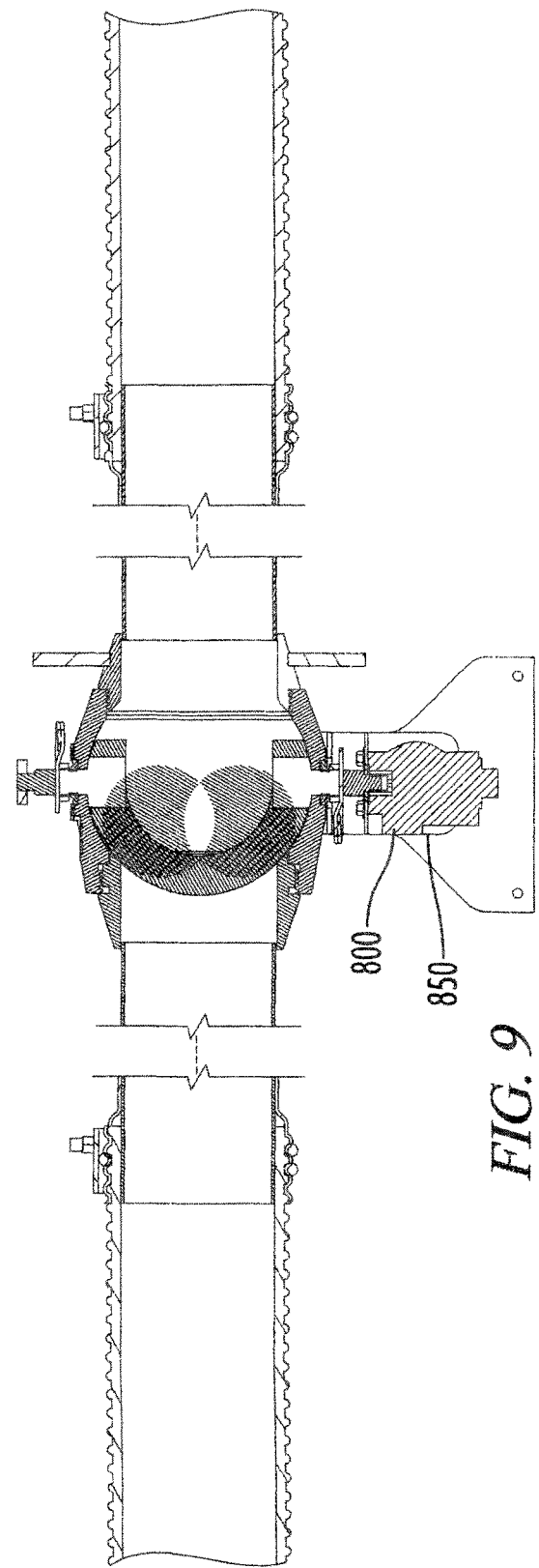
FIG. 9 is a cutaway side view of the toolless hand manipulated valve assembly showing the complete under actuator along line E-E of FIG. 3.
Figure 10:
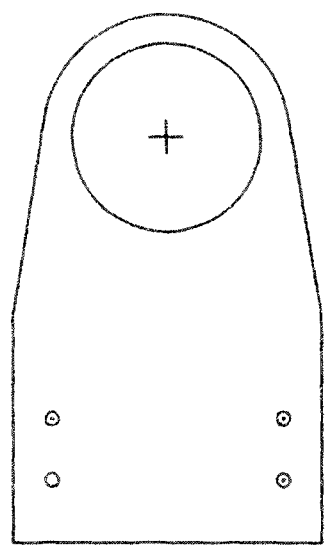
FIG. 10 is an end view of the dome valve hose support.
Figure 11:
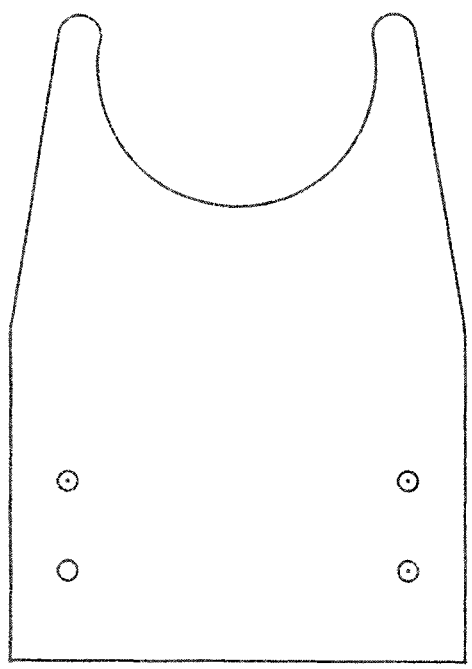
FIG. 11 is an end view of the front dome valve hose support.
Figure 12:
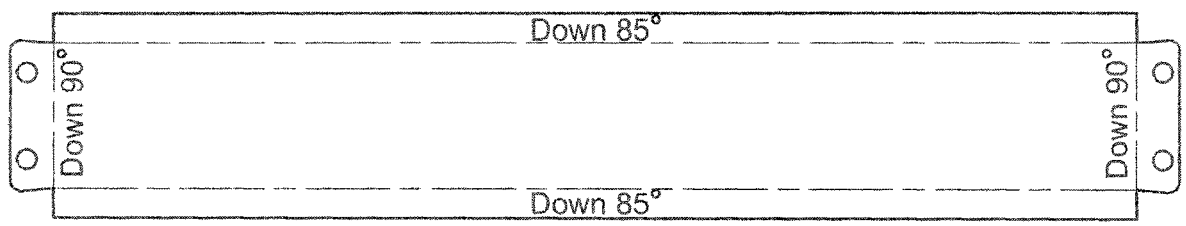
FIG. 12 is an end view of the dome valve hose support channel.
Figure 13:
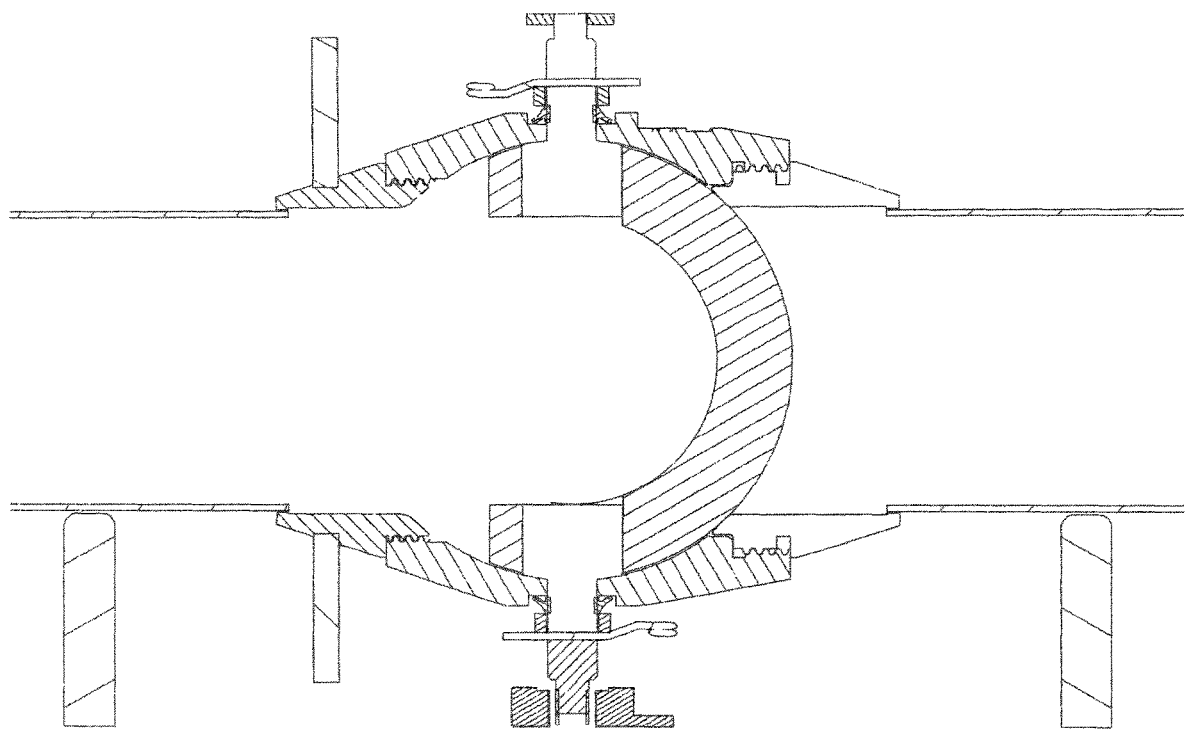
FIG. 13 is a cutaway view of the valve.
Figure 14:
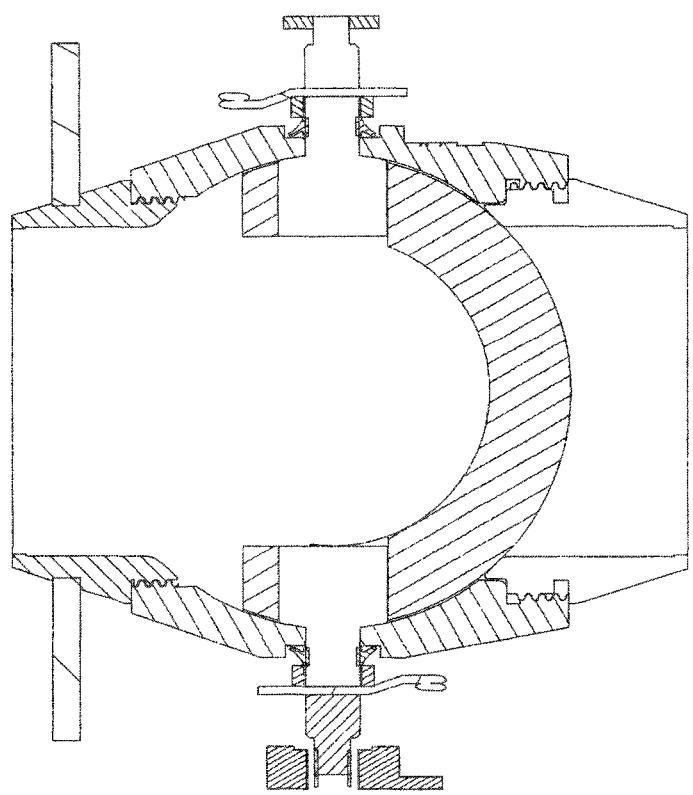
FIG. 14 shows the cutaway view of FIG. 13 with the input and output pipes removed.
Figure 15:
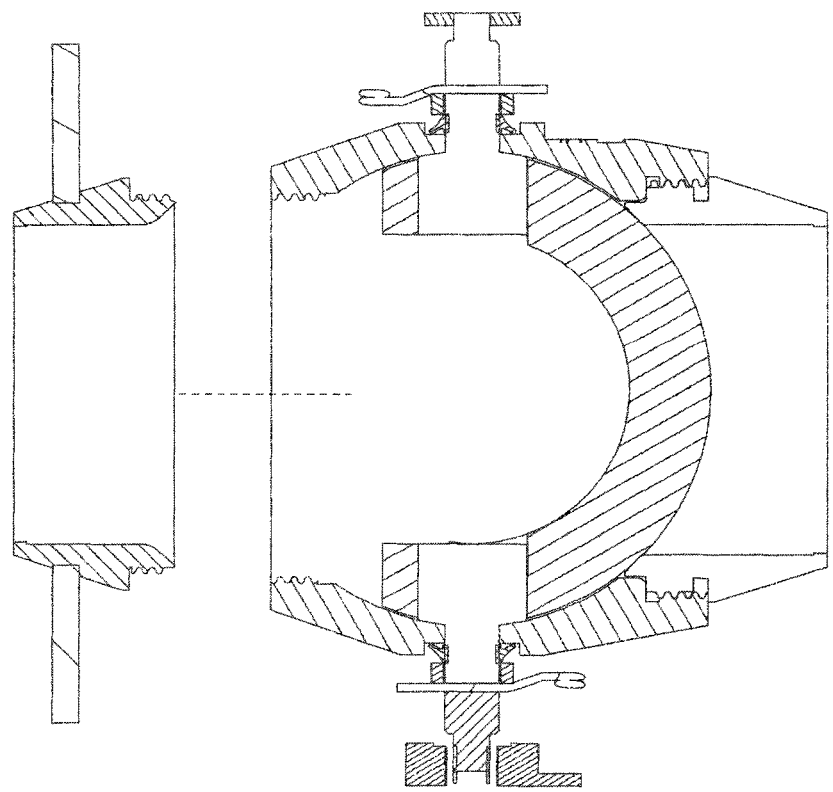
FIG. 15 shows the input end cap disassembled.
Figure 16:
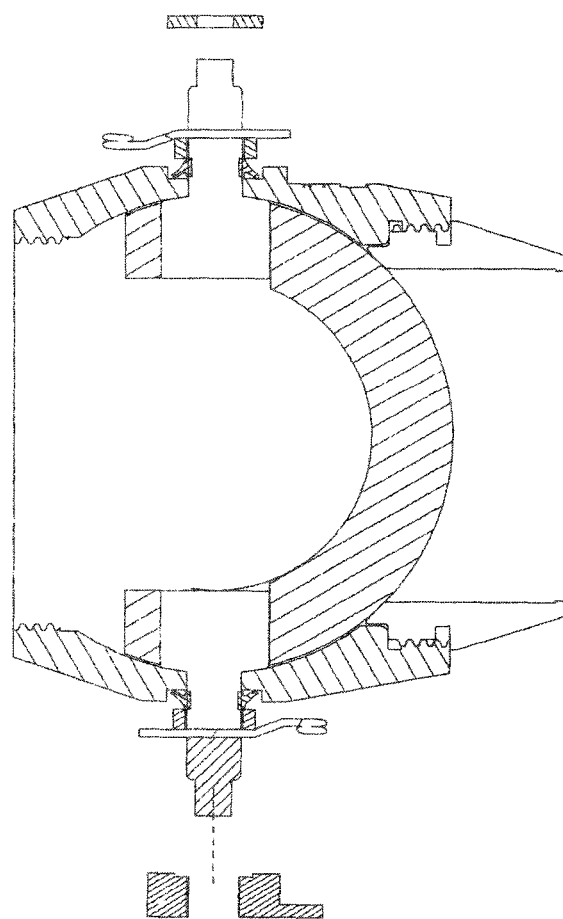
FIG. 16 shows the upper handle and lower actuator disassembled.
Figure 17:
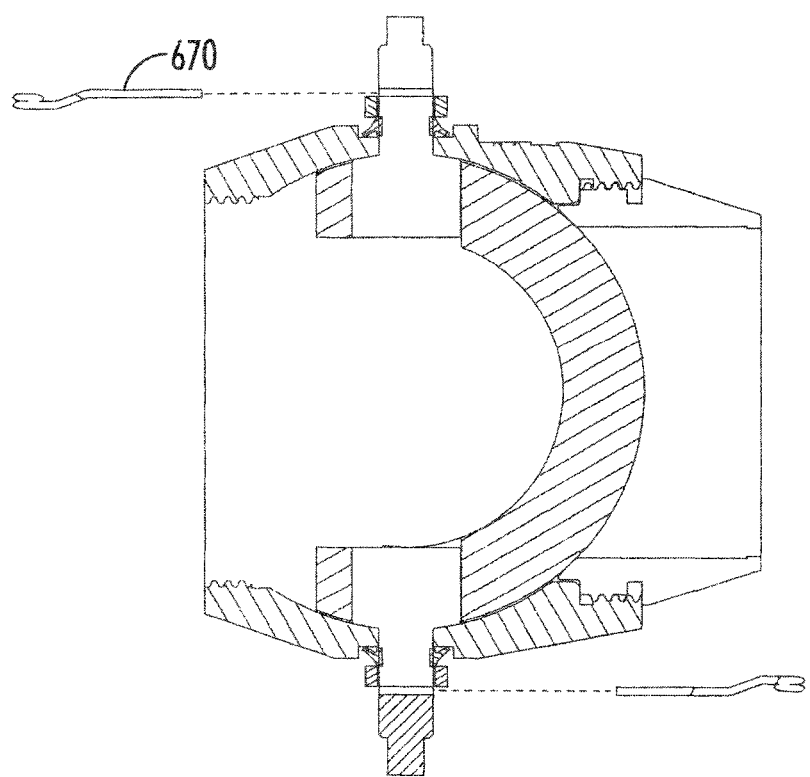
FIG. 17 shows the axle pins disassembled.
Figure 18:
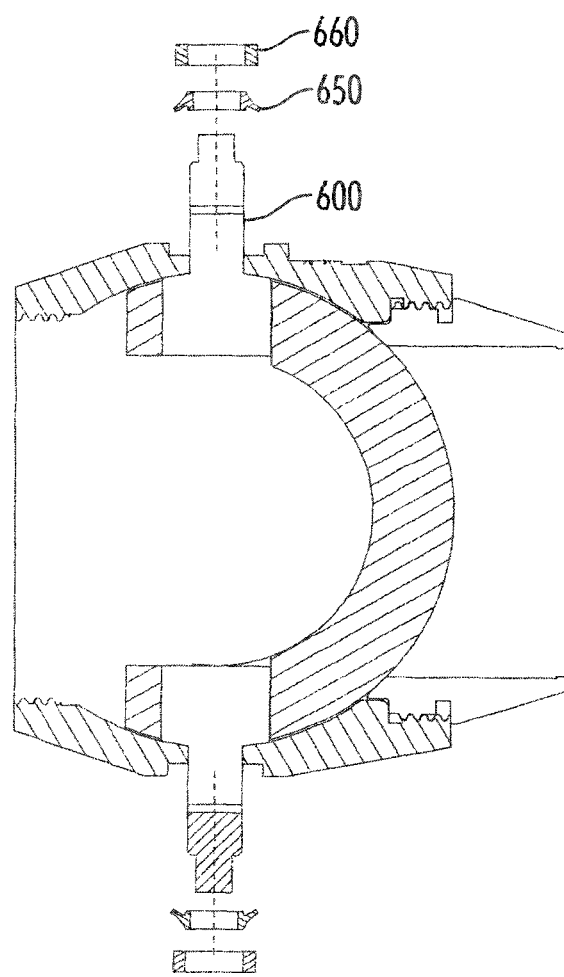
FIG. 18 shows the upper and lower washers and axle gaskets disassembled.
Figure 19:
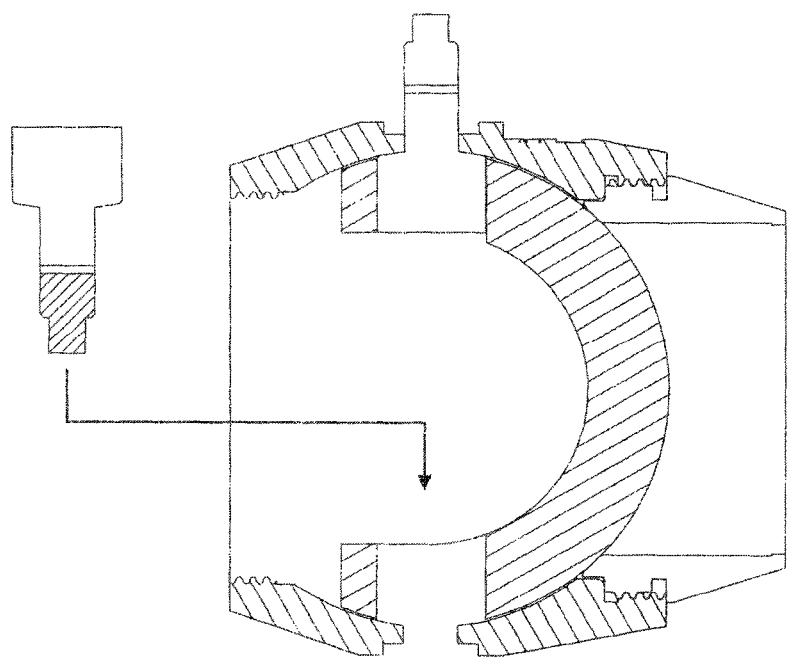
FIG. 19 shows the lower axle removed.
Figure 20:
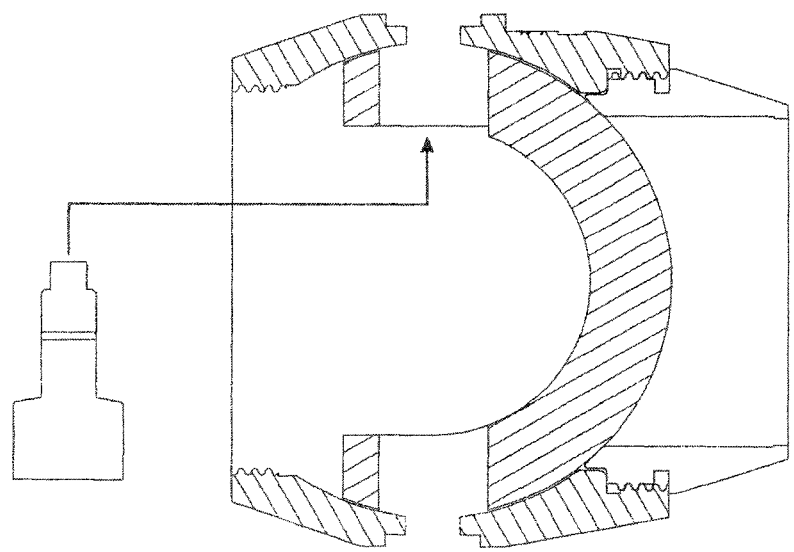
FIG. 20 shows the upper axle removed.
Figure 21:
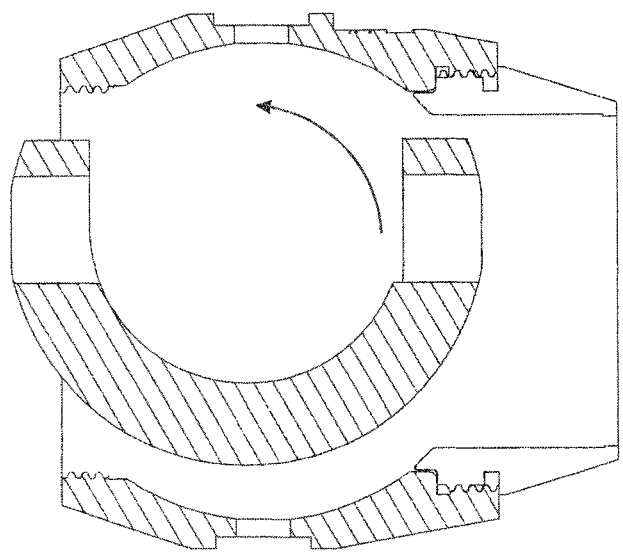
FIG. 21 shows the C gate rotated ninety degrees for removal.
Figure 22:
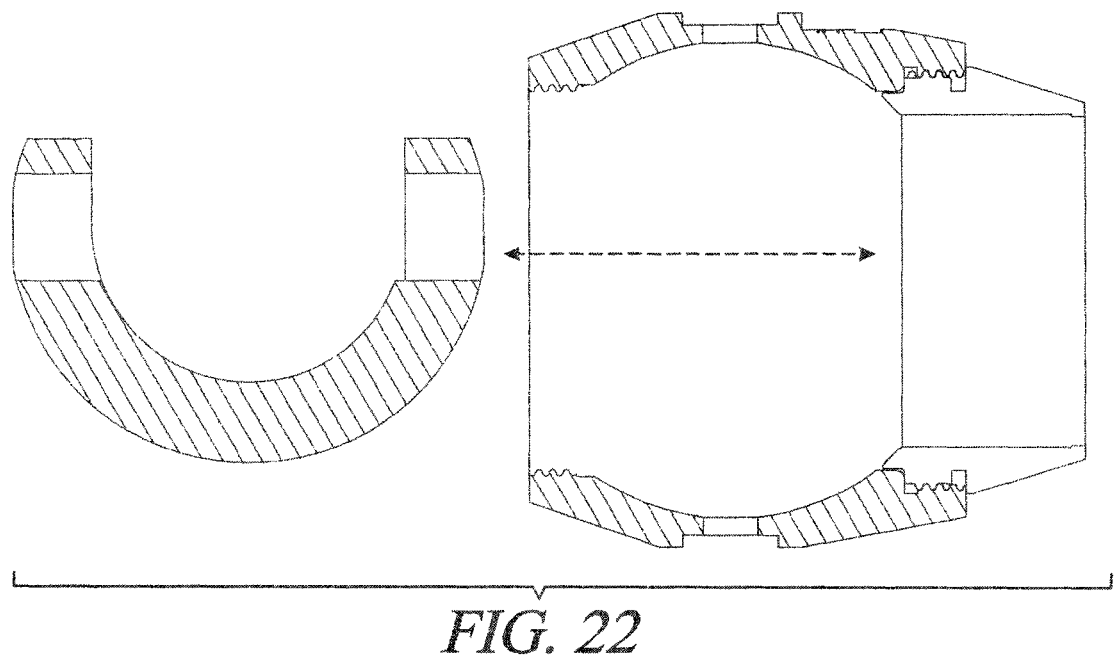
FIG. 22 shows the C gate disassembled.
Figure 23:
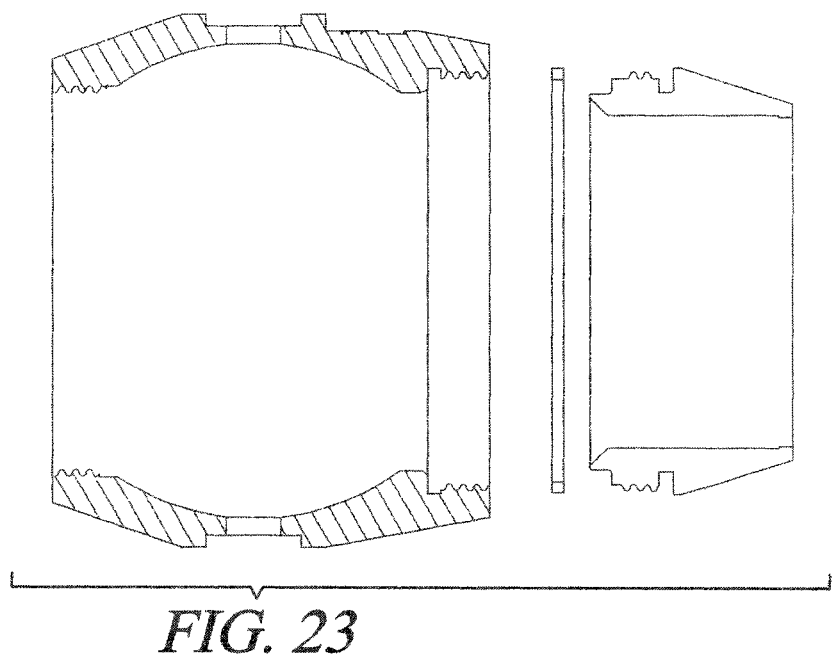
FIG. 23 shows the output gasket and output endcap disassembled.
Figure 25:
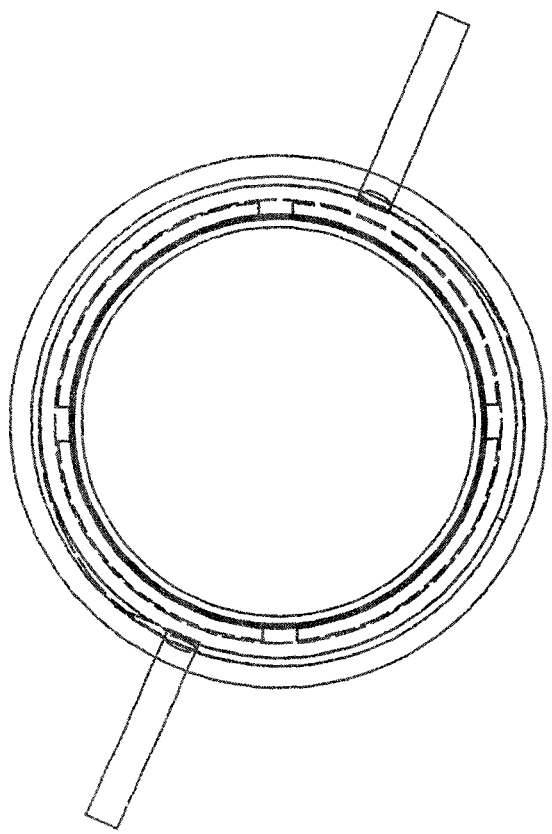
FIG. 25 shows an end view of the input endcap and pipe.
Figure 24:
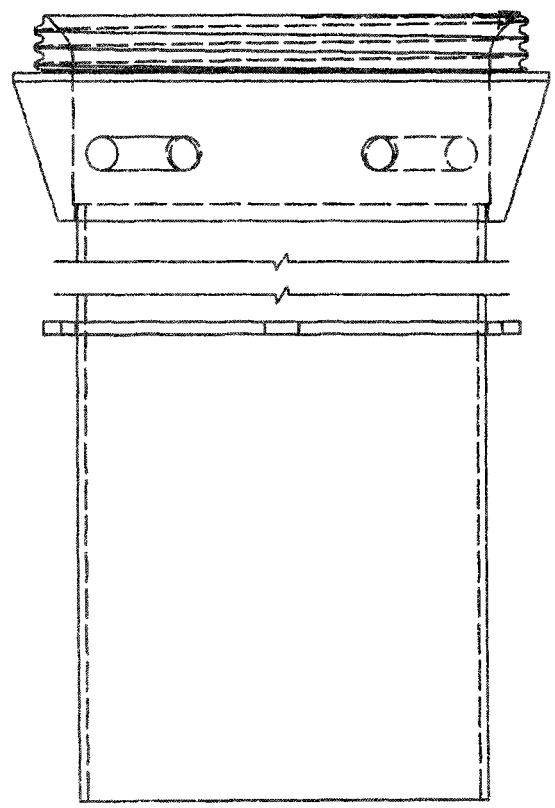
FIG. 24 shows a side view of the input endcap and pipe.
Figure 31:
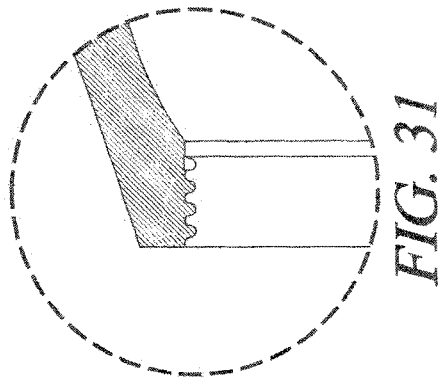
FIG. 31 shows an enlarged view of area B in FIG. 30.
Figure 29:
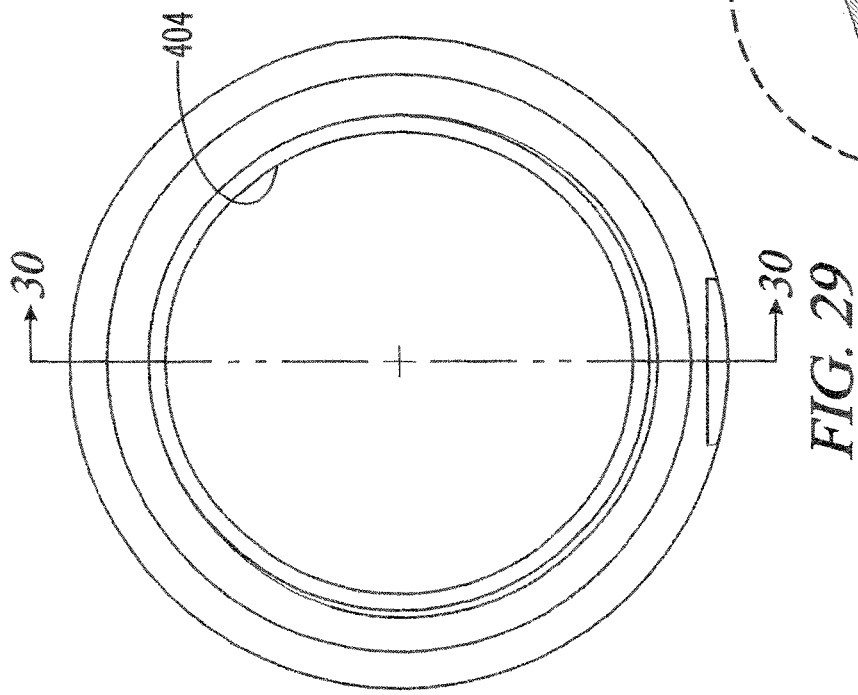
FIG. 29 shows an end view of the housing body.
Figure 30:
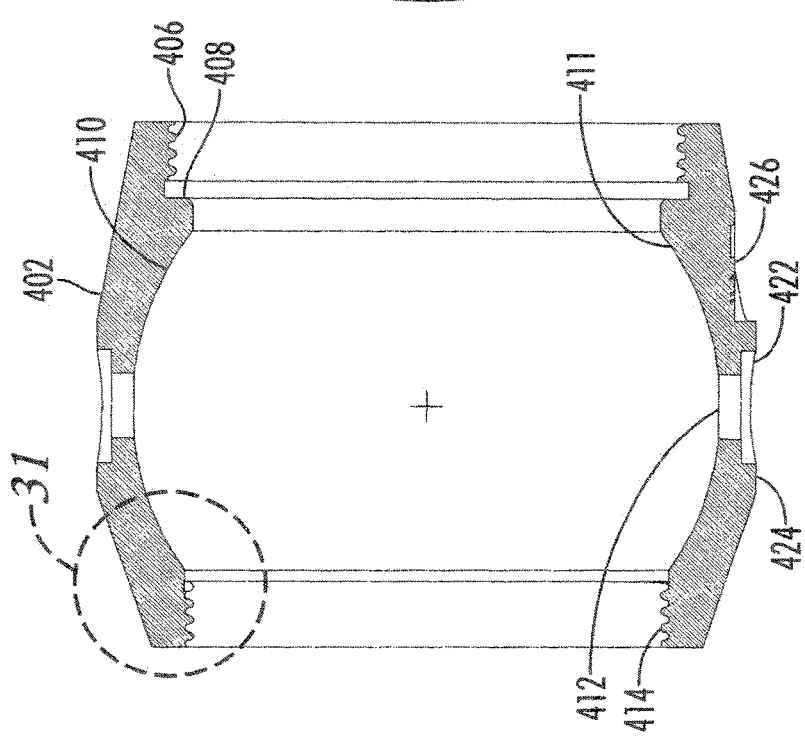
FIG. 30 shows a cutaway along line A-A FIG. 29.
Figure 32:
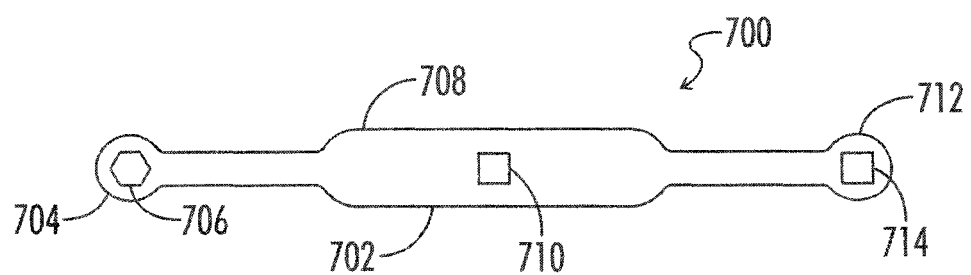
FIG. 32 shows a top view of the valve handle.
Figure 33:
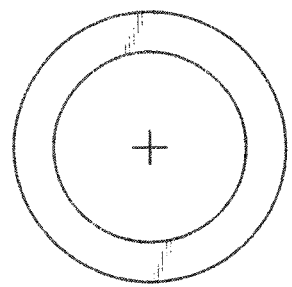
FIG. 33 shows a top view of the axle seal washer.
Figure 35:
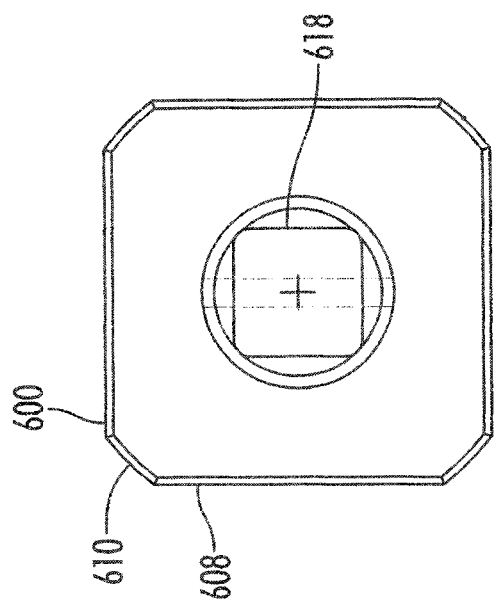
FIG. 35 shows a top view of the gate axle.
Figure 34:
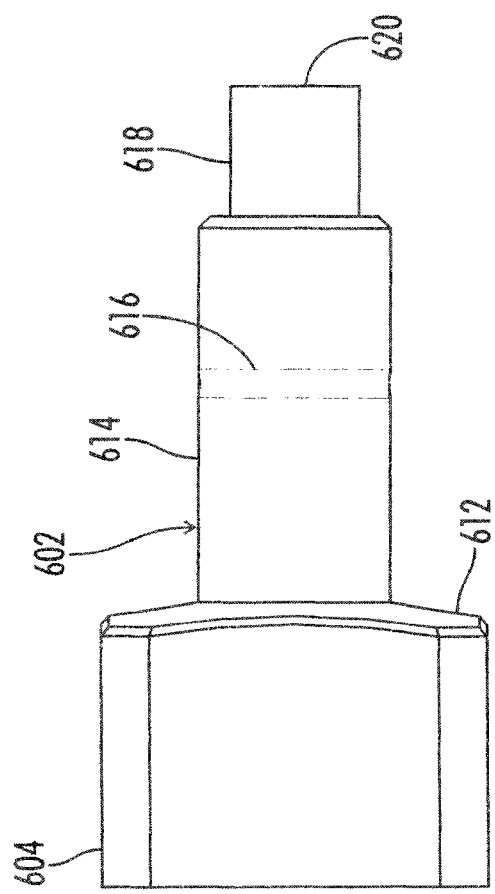
FIG. 34 shows a side view of the gate axle.
Figure 36:
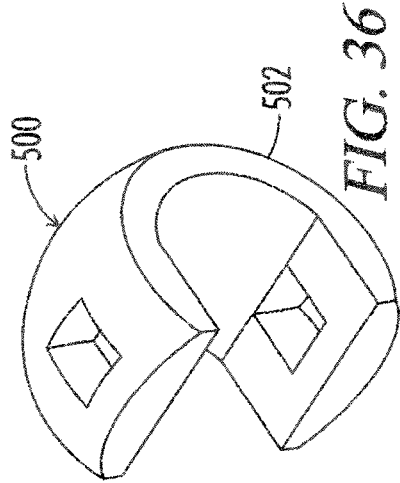
FIG. 36 shows a perspective view of the C gate.
Figure 40:
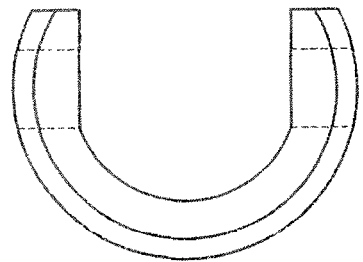
FIG. 40 shows a back view of the C gate.
Figure 41:
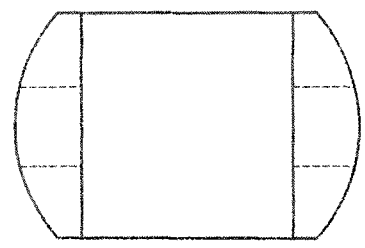
FIG. 41 shows a left side view of the C gate.
Figure 37:
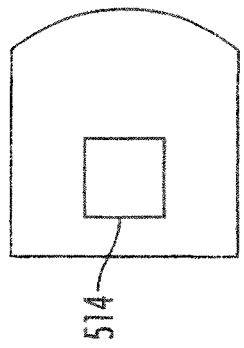
FIG. 37 shows a top view of the C gate.
Figure 39:
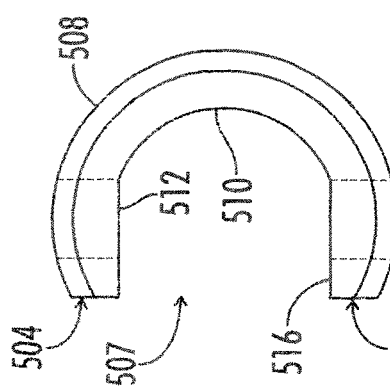
FIG. 39 shows a right sideview of the C gate.
Figure 42:
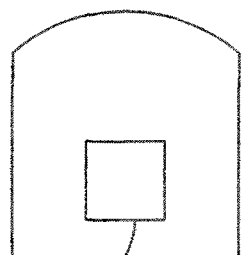
FIG. 42 shows a bottom view of the C gate.
Figure 38:
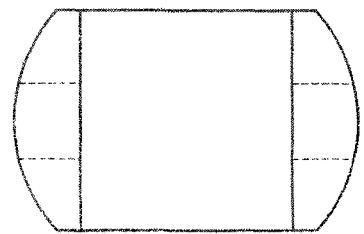
FIG. 38 shows a front view of the C gate.
Figure 44:
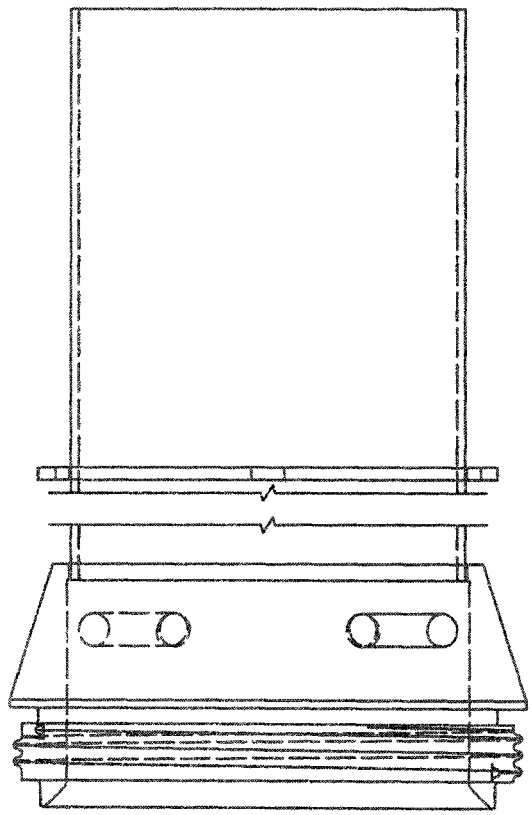
FIG. 44 shows a side view of the endcap and output pipe.
Figure 43:
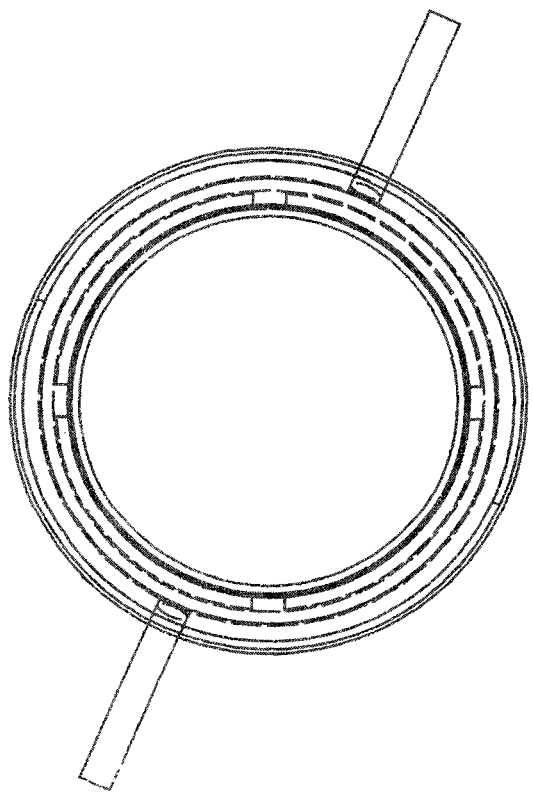
FIG. 43 shows an end view of the endcap.
Figure 47:
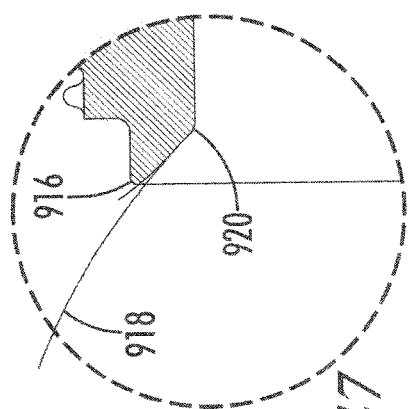
FIG. 47 shows and enlarged area B of FIG. 46
Figure 46:
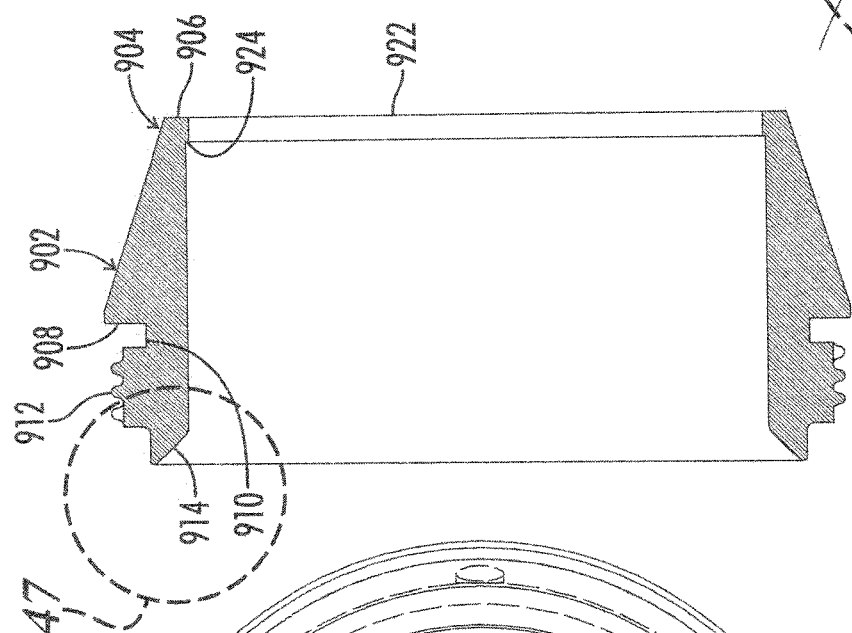
FIG. 46 shows a cutaway view of the endcap along line A-A of FIG. 45.
Figure 45:
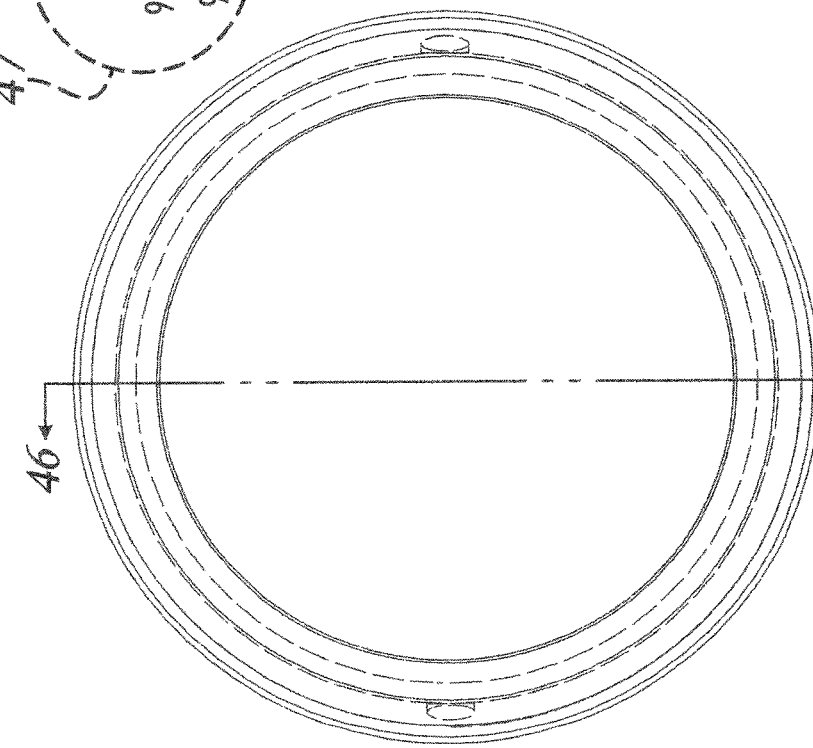
FIG. 45 shows an end view of he endcap.
Figure 48:
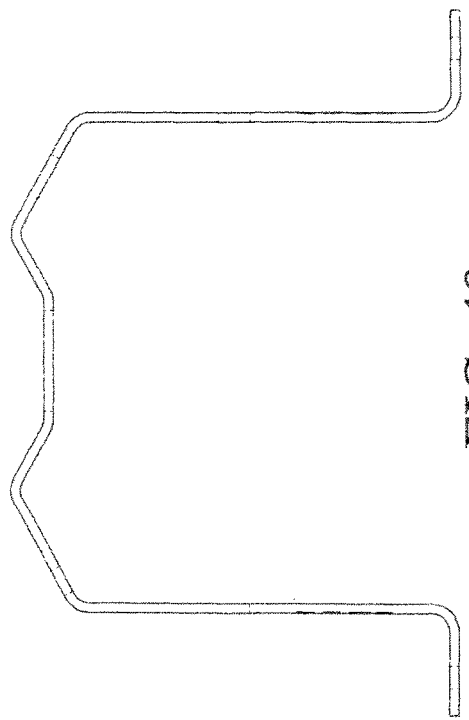
FIG. 48 shows an end view of the valve base.
Figure 49:
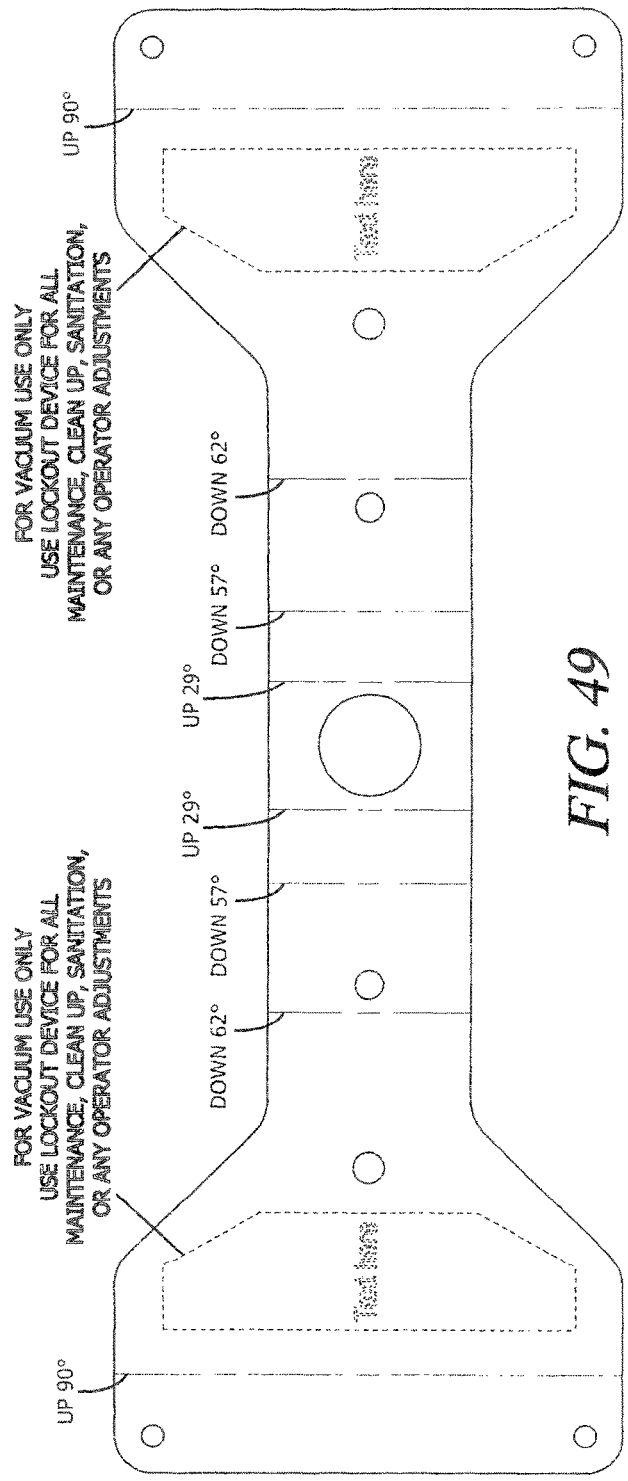
FIG. 49 shows a top view of the valve base before bending.
Figure 50:
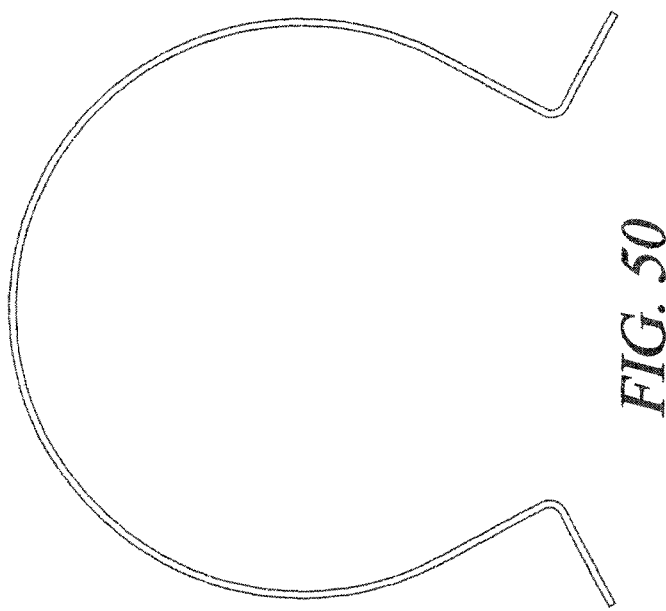
FIG. 50 shows an end view of the top ring.
Figure 51:
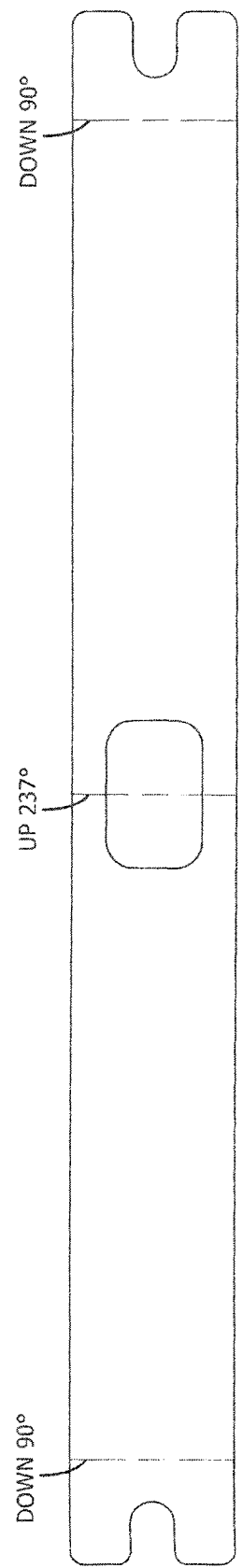
FIG. 51 shows a top view of the valve ring before bending.
Figure 52:
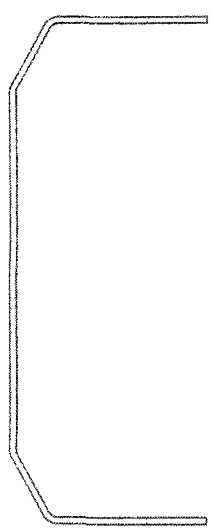
FIG. 52 shows an end view of the actuator mount.
Figure 53:
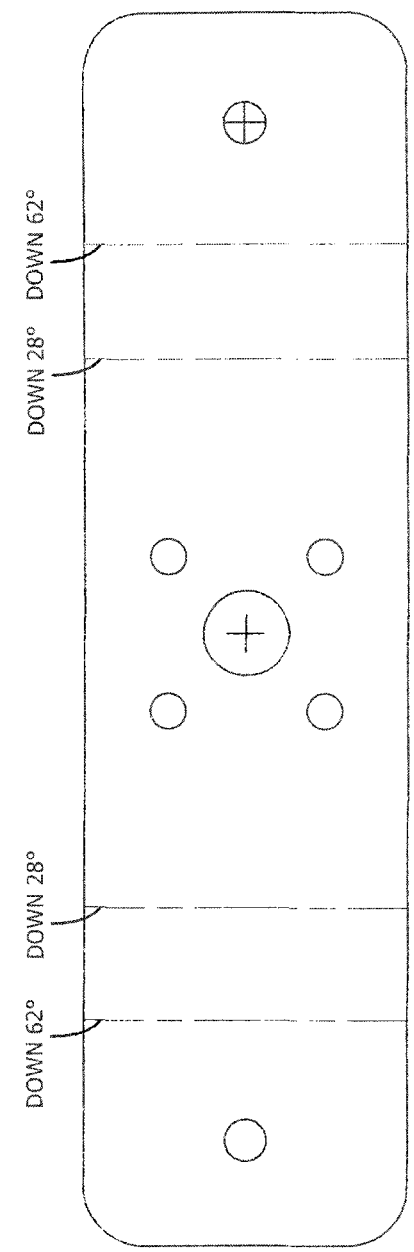
FIG. 53 shows a top view of the actuator mount before bending.

As shown in FIGS. 1 through 53 of the drawings, one exemplary embodiment of the present invention is generally shown as a toolless hand manipulated valve assembly 100. The toolless hand manipulated valve assembly 100 is entirely constructed of food grade material. This is used in vacuum pickup food transfer system where the valves must be regularly disassembled and cleaned. The ability to hand disassemble and reassemble the valve assembly 100 and the provision of parts that are large, hard to lose, and that can each be easily cleaned provides for a robust assembly with time and operational advantages over prior art assemblies.

The valve assembly 100 has main sections shown as a rotating-sliding-hose support 200 supporting an input assembly 300 connected to a middle valve assembly 400 that is connected to the output assembly 900 that is supported by another support 200.

The rotating-sliding-hose support 200 is constructed with a dome top hose support 202 and an open top hose support 204 connected by a support bracing channel 206. The dome top hose support 202 allows for the rotation and distal proximal to the valve sliding of the input barb hose 306 or the output barb hose 956 but also keeps them trapped so that they don't come completely out of place much like the oar of a rowboat. The valve proximate section of the hoses 306, 956 supported by the open top hose support allows for rotational and up and down movement of the valve end of the hose components 306, 956 for assembly and disassembly of the valve assembly 100.

The input assembly 300 includes an input flex hose 302 connected by an input hose clamp 304 to the input barb hose 306. The input barb hose 306 is welded to the non sealing input endcap 310 at the input rising weld nose 312. The weld is made on the input weld face 314. The non sealing input endcap 310 rises using an outer angled face 315 to the input limit shoulder 316 adjacent to the input threads 318 to provide a solid stop for the threaded connection to the middle valve assembly 400 using the input threads 414 and stopping against the input nose 421. The non sealing input endcap 310 includes an input clearance face 320 that drops to an input angle face 322 to allow for movement of the gasketless gate 500. The input angle face 322 smoothly transitions via an aperture face radius 324 to the input through aperture 330. The input through aperture 330 includes an internal input nose shoulder 332 for a tight fit to the input barb hose 306. Of particular importance for hand manipulation is round bar of the input handle extension 340 welded to and extending outward from the outer angled face 315 which allows the use to be able to grasp and rotate the non sealing input endcap 310.

The middle valve assembly 400 includes a gasketless housing body 402 providing a vacuum seal directly to a gasketless gate 500 pivoted on upper and lower gate axles 600. The gasketless housing body 402 and gasketless gate 500 are constructed from acetal thermoplastic and the gate axles 600 are made from stainless steel. Stainless on stainless wears and introduces contamination into the food stream. An Acetal/Delrin to 304 stainless will wear away the stainless also introducing contamination into the food stream. Thus, the present material selection is important to provide food grade compatibility that allows for caustic washes to be completed.

The gasketless housing body 402 defines an inner aperture 404 with body output threads 406 adjacent to a depth stop shoulder 408 for connecting the output seal endcap 902. The inner aperture 404 further includes the gate aperture 410 with a curved sealing face 411 and is open to the axle arm apertures 412. The input end 413 of the inner aperture 404 includes the input threads 414 previously discussed. The gasketless housing body 402 also includes an outer surface 420 with an input nose 421 for use as a depth stop as previously discussed, and also defines upper and lower axle washer pockets 422 and a flat strap contact surface 424, a flat directional indicator 426, and an output nose 427.

The gasketless gate 500 includes a gate body 502 with a top end 504, bottom end 506 separated by an opening aperture 507, outer curved surface 508, and inner curved surface 510. The outer curved surface 508 directly seals against the curved sealing face 411. The top end 504 includes a top axle plateau 512 and defines a top polygon aperture 514. Similarly, the bottom end 506 includes a bottom axle plateau 516 and defines a bottom polygon aperture 518. The top polygon aperture 514 and bottom polygon aperture 518 mate with the polygon lower body 604 of the gate axle 600 to provide controlled rotational movement of the gate body 502 using the top and bottom gate axles 600.

Each gate axle 600 includes an axle stem 602 connected to a polygon lower body 604. The polygon lower body 604 includes a polygon bottom 606 with the preferred embodiment including square polygon side 608 with relieved body corners 610 and a top curved shoulder 612 that mates into the gate aperture 410 and the curved sealing face 411 with only the axle sten extending out of the gate aperture into the axle arm apertures 412. The axle stem 602 includes an extending axle shaft 614 defining a pin aperture 616 for holding an axle pin 670 to hold the axle excluder seal 650 and axle ring washer 660 in position on both the upper and lower connections. The axle stem 602 also includes an upper polygon end 618 with a relieved edge axle top 620 for a mounting connection to the valve handle 700 on top and the air actuator 800 on bottom.

The axle excluder seal 650 should be made of food grade material such as virgin polytetrafluoroethylene, Polyurethane, ethylene propylene diene monomer (M-class) rubber, silicone and/or viton. The axle ring washer 660 and axle pin 670 should also be made of food grade material such as a stainless steel.

The valve handle 700 is preferably made of stainless steel and includes a handle body 702. The handle body 702 includes a first body end 704 defining a first polygon aperture 706; a mid body expansion 708 defining a mid polygon aperture 710; and a second body end 712 defining a second polygon aperture 714.

The air actuator 800 is mounted on the actuator mount 850 held in place using a support jam nut 860, flat washer 870, and user hand knob 880.

The output assembly 900 includes an output seal endcap 902 and output hose assembly 950.

The output seal endcap 902 includes an output rising weld nose 904 ending at output weld face 906 welded to the output barb hose 956. The output rising weld nose 904 drops at the output limit shoulder 908 that acts as a stop when the sealing endcap output threads 912 engage the body output threads 406. Note that this sealing endcap 902 includes an output gasket groove 910 for receiving an output gasket 940 to maintain the seal. The output sealing face 914 includes an upper thread face radius 916 dropping into the face curvature 918 and ends a the lower aperture face radius 920. The output seal endcap 902 defines the output through aperture 922 which also has a internal output nose shoulder 924 for a tight fit with the output barb hose 956 much like the input end. The output seal endcap also uses output handle extensions 930 for easy user manipulation. Note that as shown in FIGS. 1 and 2 that the output handle extensions 930 are rotated ninety degrees in relation to the input handle extension 340 so that proper connections can be visually verified when looking at the valve assembly 100.

Much like the input assembly 300, the output hose assembly 950 includes an output flex hose 952 connected via an output hose clamp 954 to the output barb hose 956.

Reference numerals used throughout the detailed description and the drawings correspond to the following elements:

Toolless hand manipulated valve assembly 100
Rotating-sliding-hose support 200
Dome top hose support 202
Open top hose support 204
Support bracing channel 206
Input assembly 300
Input flex hose 302
Input hose clamp 304
Input barb hose 306
Non sealing input endcap 310
Input rising weld nose 312
Input weld face 314
Outer angled face 315
Input limit shoulder 316
Input threads 318
Input clearance face 320
Input angle face 322
Aperture face radius 324
Input through aperture 330
Internal input nose shoulder 332
Input handle extension 340
Middle valve assembly 400
Gasketless housing body 402
Inner aperture 404
Body output threads 406
Depth stop shoulder 408
Gate aperture 410
Curved sealing face 411
Axle arm apertures 412
Input threads 414
Outer surface 420
Axle washer pockets 422
flat strap contact surface 424
Flat directional indicator 426
Gasketless Gate 500
Gate body 502
Top end 504
Bottom end 506
Opening aperture 507
Outer curved surface 508
Inner curved surface 510
Top Axle plateau 512
Top polygon aperture 514
Bottom axle plateau 516
Bottom polygon aperture 518
Gate Axle 600
Axle stem 602
Polygon lower body 604
Polygon bottom 606
Square polygon side 608
Relieved body corners 610
Top curved shoulder 612
Extending axle shaft 614
Pin aperture 616
Upper polygon end 618
Axle top 620
Axle excluder seal 650
Axle ring washer 660
Axle pin 670
Valve handle 700
Handle body 702
First body end 704
First polygon aperture 706
Mid body expansion 708
Mid polygon aperture 710
Second body end 712
Second polygon aperture 714
Air actuator 800
Actuator mount 850
Support jam nut 860
Flat washer 870
User hand knob 880
Output assembly 900
Output seal endcap 902
Output rising weld nose 904
Output weld face 906
Output limit shoulder 908
Output gasket groove 910
Sealing endcap output threads 912
Output sealing face 914
Thread face radius 916
Face curvature 918
Aperture face radius 920

Output through aperture 922
Internal output nose shoulder 924
Output handle extensions 930
Output hose assembly 950
Output flex hose 952
Output hose clamp 954
Output barb hose 956

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A vacuum valve comprising:
a valve body with a central through aperture defining an input end, a central rotational valve face, and an output end;
a removeable rotary C gate selectively inserted into the central through aperture and removeable through the input end, the removable rotary C gate defining an opening aperture, and a non circular aperture;
the valve body further defining an axle aperture with an internal body shoulder;
a removeable axle defining a non circular body and an axle stem with an external fastener connection, the non circular body and axle stem sized for installation through the opening aperture;
the non circular body positioned in the non circular aperture;
the axle stem positioned in the axle aperture;
the axle shoulder positioned adjacent to the internal body shoulder;
a removeable fastener secured to the external fastener connection; and
wherein the axle stems selectively and rotatably positions the rotary C gate in the central aperture adjacent to the rotational valve face.

2. The vacuum valve of claim 1, further comprising:
an axle gasket sealing the axle stem to the valve body.

3. The vacuum valve of claim 1, further comprising:
the axle stem defining an upper polygon end.

4. The vacuum valve of claim 1, further comprising:
the non-circular aperture is a polygon aperture.

5. The vacuum valve of claim 1, further comprising:
the polygon aperture defining a square shape with rounded corners.

6. The vacuum valve of claim 1, further comprising:
an input assembly affixed adjacent the input end.

7. The vacuum valve of claim 1, further comprising:
an output assembly affixed adjacent the output end.

8. A vacuum valve comprising:
a valve body with a central through aperture defining an input end, a central rotational valve face, and an output end, the valve body further defining an axle aperture with an internal body shoulder;
a removeable rotary C gate selectively inserted into the central through aperture and removeable through the input end, the removable rotary C gate defining an opening aperture, and a non circular aperture;
a removeable axle defining a non circular body positioned in the non circular aperture, the non circular body defining an axle shoulder positioned adjacent to the internal body shoulder;
the removable axle further defining an axle stem positioned in the axle aperture;
the removable axle further defining an external fastener connection;
a removeable fastener secured to the external fastener connection; and
an axle gasket sealing the axle stem to the valve body.

9. The vacuum valve of claim 8, further comprising:
the axle stem defining an upper polygon end.

10. The vacuum valve of claim 8, further comprising:
the polygon aperture defining a square shape with rounded corners.

* * * * *